United States Patent [19]
Risberg

[11] 3,904,846
[45] Sept. 9, 1975

[54] ADAPTIVE CONTROL FOR ARC WELDING
[75] Inventor: Robert L. Risberg, Brookfield, Wis.
[73] Assignee: Miller Electric Manufacturing Company, Appleton, Wis.
[22] Filed: Dec. 19, 1973
[21] Appl. No.: 426,162

[52] U.S. Cl................ 219/135; 219/131 F; 219/137
[51] Int. Cl.²............................................ B23K 9/10
[58] Field of Search..... 219/131 WR, 131 R, 131 F, 219/135, 137; 321/48, 50, 53

[56] References Cited
UNITED STATES PATENTS

| | | | |
|---|---|---|---|
| 3,530,359 | 9/1970 | Grist................................ | 219/135 X |
| 3,584,186 | 6/1971 | Stearns et al. .................. | 219/131 W |
| 3,614,377 | 10/1971 | Stearns et al. .................. | 219/131 R |
| 3,728,516 | 4/1973 | Daspit.............................. | 219/135 X |

*Primary Examiner*—J. V. Truhe
*Assistant Examiner*—Clifford C. Shaw
*Attorney, Agent, or Firm*—Sughrue, Rothwell, Mion, Zinn and Macpeak

[57] ABSTRACT

A semiconductor electronic chopper precisely controls the current to a welding arc in response to arc length as represented by arc voltage. The actual arc current is compared with a reference current to generate a switching signal which adaptively controls electronic switches in order to meet arc requirements. For manual welding with covered electrodes (SMAW), frequently referred to as "stick welding," a slope control potentiometer is used to vary the value of the reference current when the arc length (voltage) deviates from a preset normal operating length (voltage). This creates a family of volt-ampere characteristic curves all passing through the preset voltage and current operating point. A digging characteristic is obtained by increasing the reference current rapidly when the arc voltage (length) goes below a preset value. An intermittent spray transfer welding process, particularly applicable to continuous wire feed electrode systems, is created by maintaining the welding current at a high constant value until the electrode wire burns back to a maximum desired length (voltage) and then automatically reducing the current to a low constant value until the electrode is advanced sufficiently to shorten the arc and signal the system to change to a high current, etc.

11 Claims, 16 Drawing Figures

| FIG.3A | FIG.3B | FIG.3C | FIG.3D |

ADAPTIVE CONTROL FOR ARC WELDING

BACKGROUND OF THE INVENTION

1. Field of the Invention

This invention relates to the field of arc welders and, more particularly, to a novel apparatus and process for quickly controlling the current applied to the arc in accordance with the condition of the arc.

2. Description of the Prior Art

Most recent applications of solid state power electronics to the arc welding field have taken the form of conventional electronic circuits, such as constant frequency choppers, phase-controlled rectifiers, etc., and applying these circuits in a conventional way to welding power supplies. The result has been little real improvement over the conventional arc control circuits using saturable reactors or magnetic amplifiers or at best only a very slight improvement at high cost.

By contrast, the present invention is the result of carefully examining the welding process and determining the ideal electrical requirements, and then instantaneously and automatically meeting those requirements with minimum hardware and cost. In the past, for "stick" welding, machines have been built with high impedance to obtain a drooping volt-ampere characteristic. This high impedance was provided by a high leakage reactance and/or resistance. In order to obtain greater flexibility, saturable reactors, magnetic amplifiers or resistors have been used with regulators to control the output volt-ampere characteristic.

The approach of using variable volt-ampere slopes has been considered in the past but has generally taken the form of a family of volt-ampere curves with a common origin at the no-load voltage point.

The next logical step of improvement would be to have a separate volt-ampere characteristic or slope, extending from the no-load voltage (.e.g 80 volts) to the upper limit (e.g. 40 volts) of the operating arc voltage, to be used only for starting the arc. A family of slopes could then be provided with their origins adjustable along the 40 volt operating voltage line. However, a system of this sort is inherently frustrating to the welder, because he would prefer to have the normal arc voltage (length) rather than the highest operating arc voltage, as a point of reference. The upper operating limit of the arc voltage is a region seldom used in the welding process.

Conventional wire feed electrode systems use the short circuiting dip transfer method, the spray transfer method, or the pulsed arc method of forcing spray transfer droplets.

Each method has its shortcomings. Dip transfer does not have the penetration of spray transfer and is not desirable on aluminum. Spray transfer is quite hot and difficult to weld out of position. The pulsed arc method imposes a fixed frequency of droplet transfer, normally a multiple of line frequency, is adversely affected by changes in wire feed rate, and is difficult to set up due to the need for finding the correct wire feed rate for each adjustment of background voltage, pulse voltage and wire size.

SUMMARY OF THE INVENTION

The general object of the present invention is to provide an improved method and apparatus for automatically and instantaneously meeting all the known requirements of the SMAW, GSMAW, GTAW and asymmetrical welding processes at a practical cost.

An important object of this invention is to provide a means and method of quickly and adaptively controlling a welding arc by automatically adjusting, in response to arc voltage, the operation of an electronic switching circuit supplying current to the arc.

Another important object of this invention is to provide a wide range of volt-ampere output characteristics for a stick arc welder. In accordance with my invention, the normal operating arc voltage, rather than the highest operating voltage, for a given process is used as the origin for a family of volt-ampere characteristics that have a desired slope above and below this normal operating arc voltage level.

A more specific object of the invention is to provide a volt-ampere characteristic slope adjustment which is completely independent of the current and voltage set point. For example, if the current is set for 100 amps and the normal operating arc voltage set at 24 volts, the slope of the volt-ampere characteristic passing through this normal operating point can be adjusted without altering the 24 volt current, or, in the alternative, the current at the normal 24 volt arc voltage can be adjusted or set without altering the slope. Furthermore, the normal arc voltage can be adjusted from the lowest to the highest operating voltage (e.g. 40 volts) without altering the slope.

An additional object is to provide a power supply whose volt-ampere output curve consists of three (or more) different slopes wtih distinct selectable transition points. A "digging" characteristic can be created by selecting a transition point, from normal to nearly horizontal slope (constant potential), at a value below, i.e. 2/3 of, the established operating arc voltage. A very rapid increase in arc current accompanies a small drop in arc voltage. An arc-maintaining, constant current characteristic can be achieved by selecting a second transition point, from normal to nearly vertical slope, at a value higher than the established operating arc voltage. Furthermore, other slope changes can be created at other transition points on the volt-ampere curve to create any desired static or transient characteristic.

Still another object of the invention is to provide a voltage source for spray welding wherein the peak-to-peak voltage ripple is regulated by an electronic switching circuit, such as a chopper, to a desired amount $\Delta V$ on either side of a desired mean by causing a voltage signal to automatically switch the chopper when $\Delta V$ is exceeded in either direction.

A further object of the invention is to provide a voltage source for conventional dip transfer welding wherein peak-to-peak voltage is regulated as described above, and, in addition, if the arc current exceeds a predetermined limit during the shorted arc process, the signal to switch the chopper is determined by a current deviation $\Delta I$, rather than $\Delta V$, to prevent spatter from too high a current when the arc is restruck following droplet transfer.

Another object of the invention is to provide an improved method of automatic on-off or intermittent spray transfer welding wherein arc length is detected by measuring arc voltage, and a low constant current is supplied until the electrode is very close to the work. Current is then automatically switched to a high constant value, and spray transfer is allowed to proceed until the electrode burns back a desired amount, the current then being returned to a low constant value, etc. Consequently, there is provided a self-regulating spray transfer which can cope with wide variations in wire feed rate without need of readjustment, and which has the stiff directivity of spray with deep penetration, but which is usable in out-of-position welding due to the puddle cooling between spray intervals.

Another object is to provide for gas tungsten arc welding (GTAW) a power source that has a constant current characteristic for automated fixtures or mills, but has a variable volt-ampere slope for manual GTAW.

Another object is to provide a power supply having the aforementioned characteristics but which also has very low ripple in the output current.

Another object is to provide an asymmetrical GTAW system that will provide a controlled current with any desired volt-ampere characteristic, and will also supply high reverse current pulses at a repetition rate sufficient for cleaning off oxides.

Another object is to provide a universal welding control system that can be used selectively for all arc welding processes by the operation of a simple selector switch to change the power supply characteristics.

DESCRIPTION OF THE PREFERRED EMBODIMENTS

Figure 1:
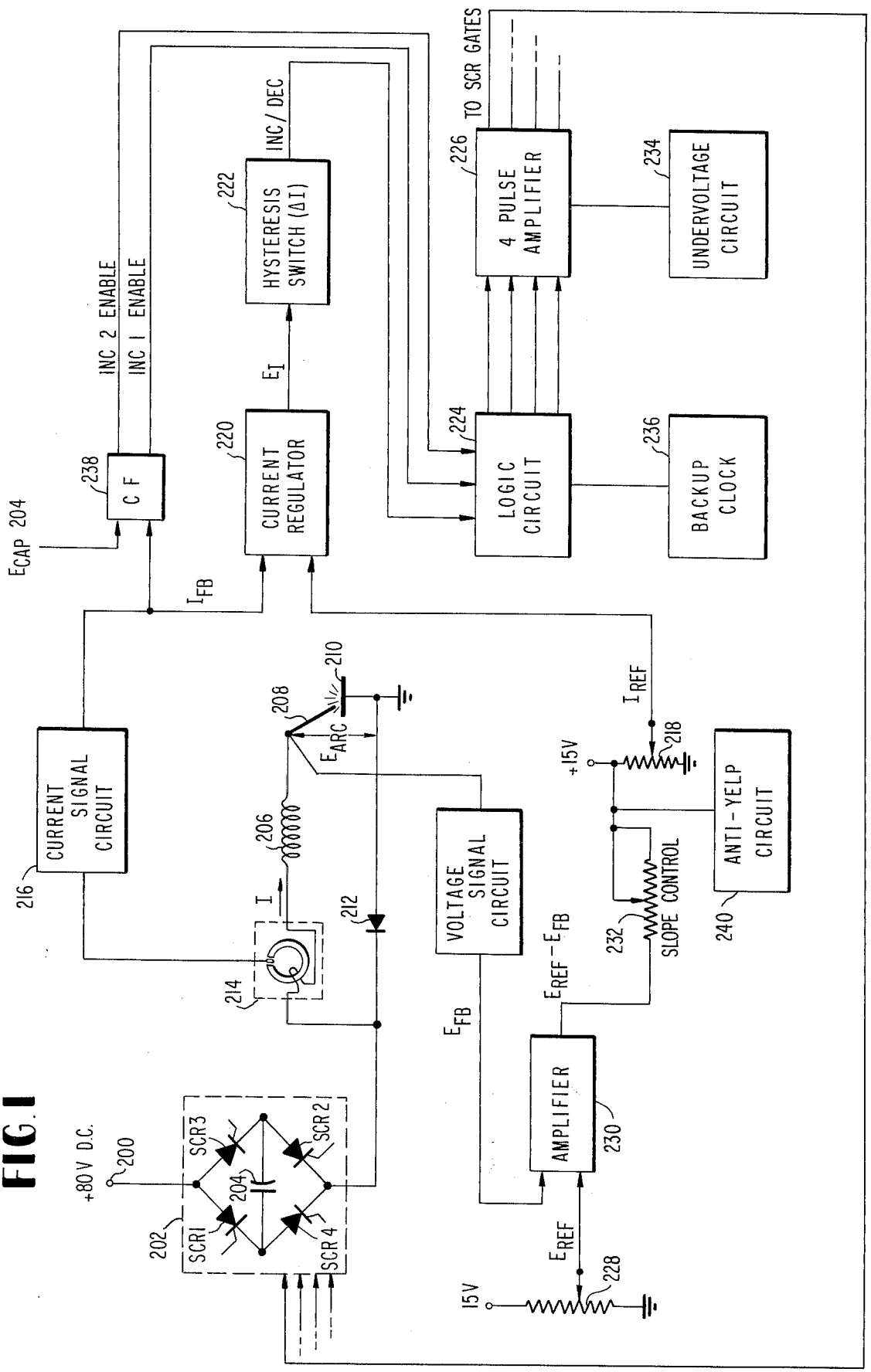
FIG. 1 is a schematic block diagram illustrating the basic operation of my improved apparatus and method for adaptive control of a welding arc.

FIG. 1 is a functional block diagram illustrating the operation of my improved apparatus and method for adaptive control of a welding arc.

An a.c. power source is connected through a transformer and a rectifier to provide 80 volts d.c. on a d.c. bus 200. The welding current is controlled by an electronic switching circuit, such as a bridge chopper circuit 202 containing four controlled rectifiers SCR1, SCR2, SCR3 and SCR4, and a commutating capacitor 204, and free wheeling diode 212. The bridge is connected through a conventional output inductor 206 to a welding electrode 208. The welding arc is formed between the electrode and a workpiece 210.

The controlled rectifiers in the chopper bridge 202 are selectively rendered conducting by firing pulses applied to their gate electrodes and are selectively commutated off by the commutating capacitor 204. As will be explained below, the bridge is rendered alternately conducting and non-conducting for variable time periods, which are determined by the operation of my novel adaptive control system, such that the welding current I never varies by a difference of more than a predetermined $\pm\Delta I$ from the welder's output volt-ampere characteristic.

Diode 212 is a free-wheeling diode which provides a path for the inductive current of inductor 206 when the chopper 202 is turned off and therefore is not supplying source current to the welding arc.

Figures 3, 3A:
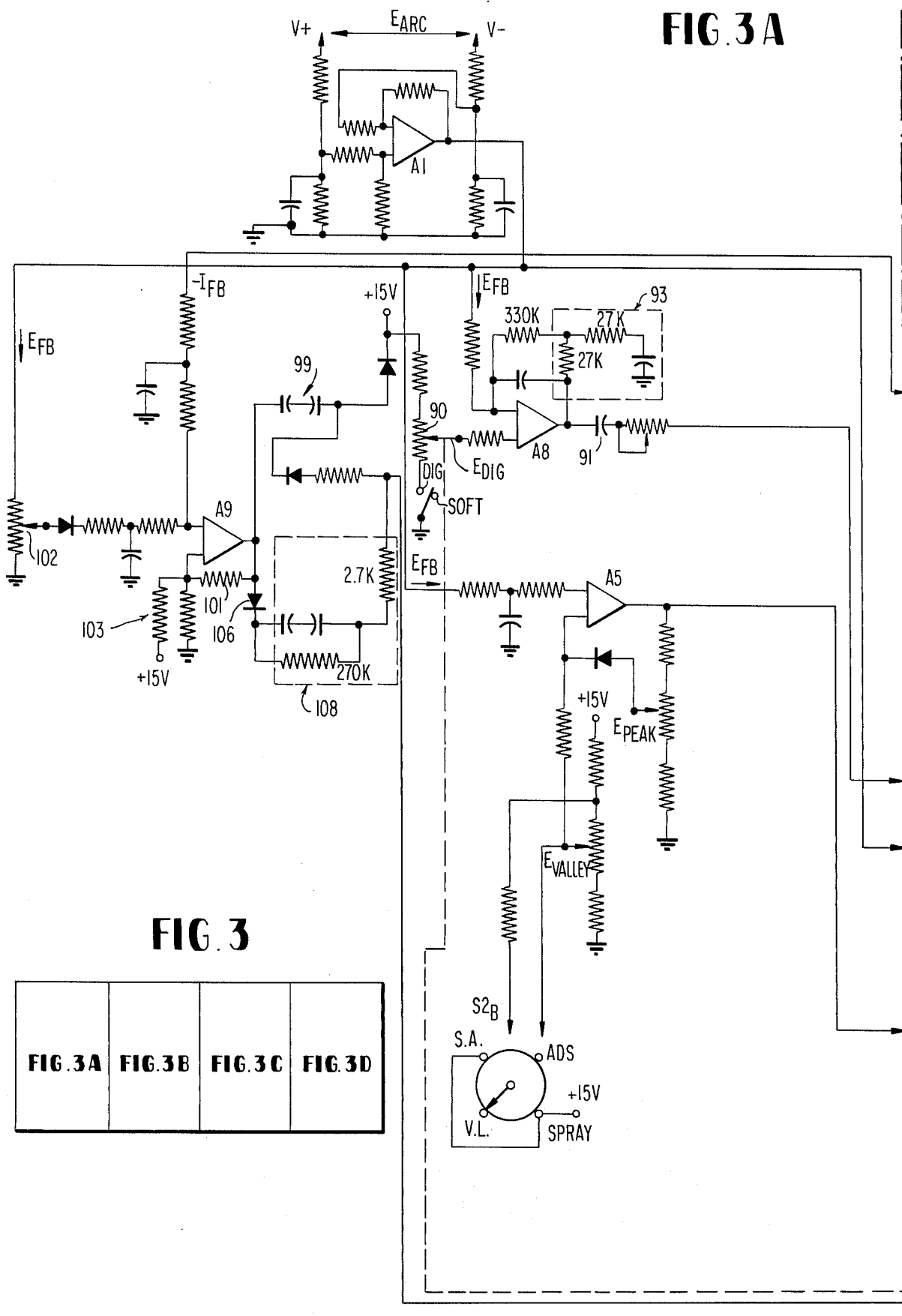
FIG. 3 is a detailed schematic diagram of a preferred embodiment of adaptive control system illustrated in FIG. 1.
Figure 3B:
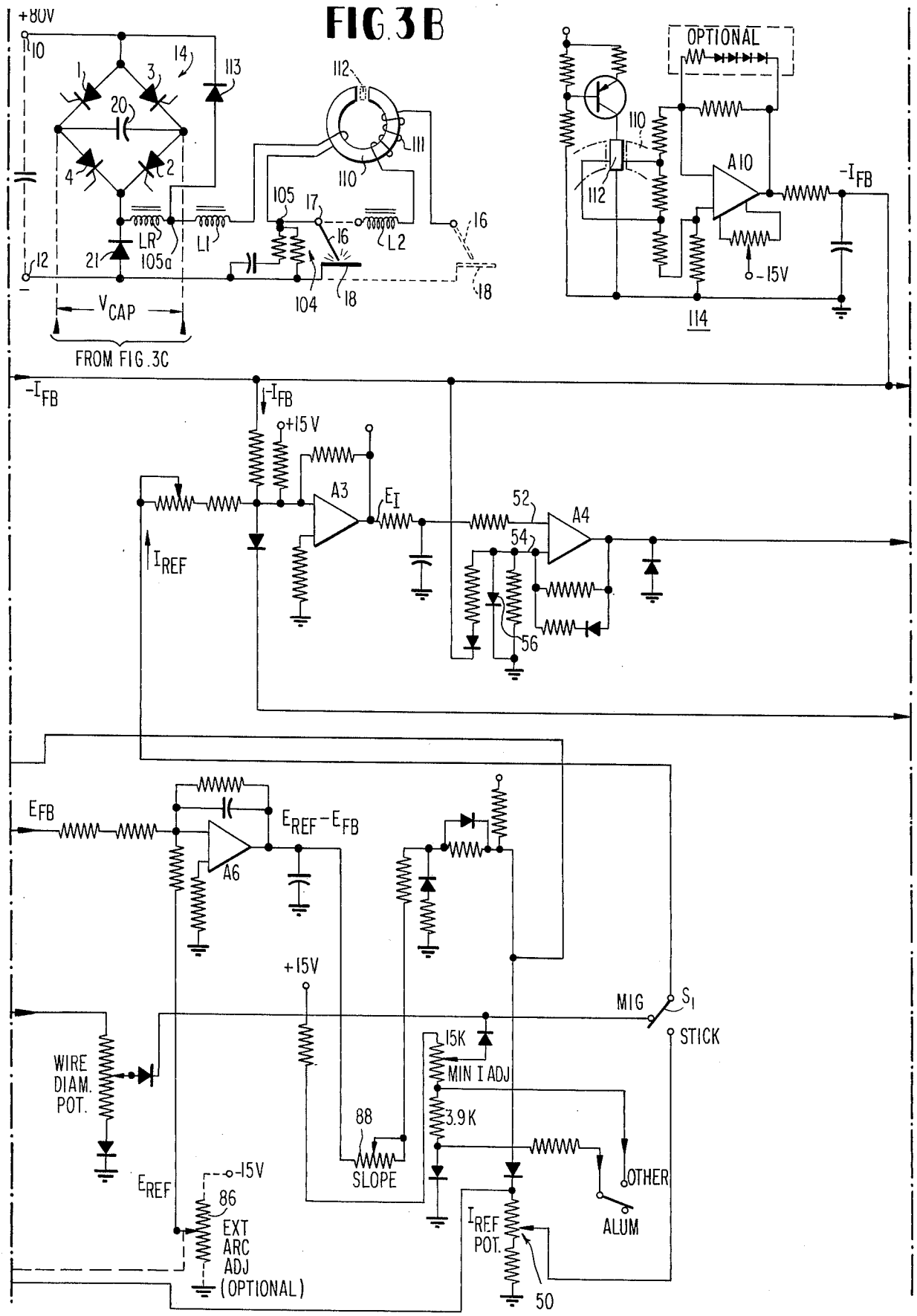
Figure 3C:
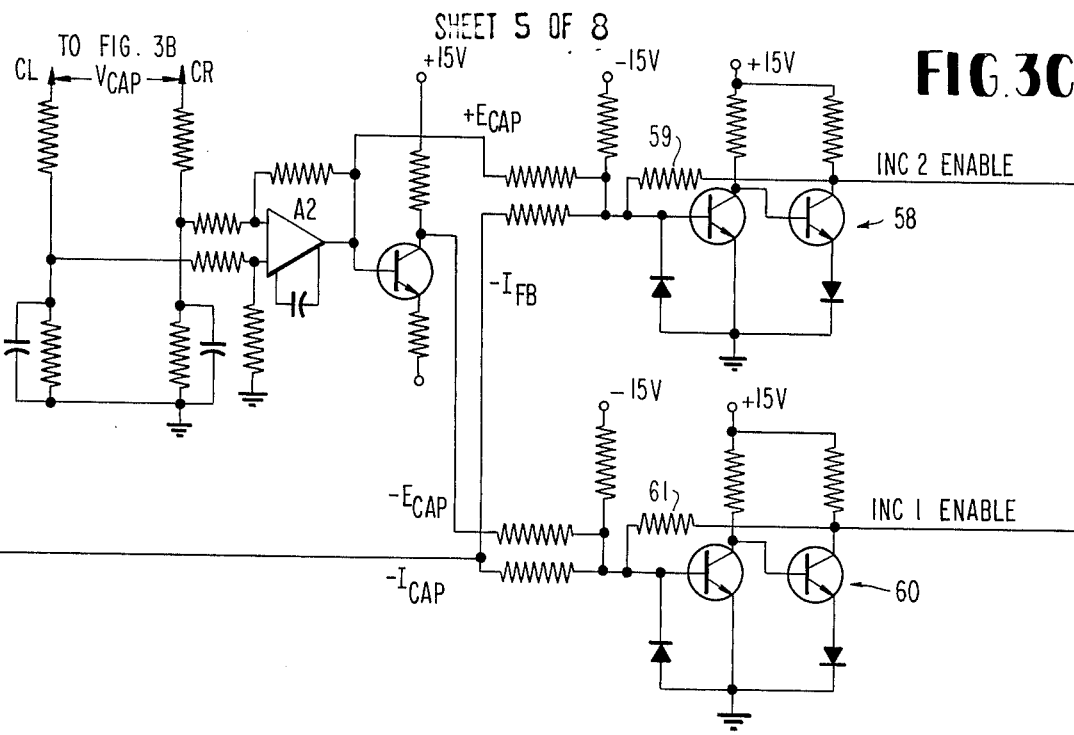
Figure 3C:
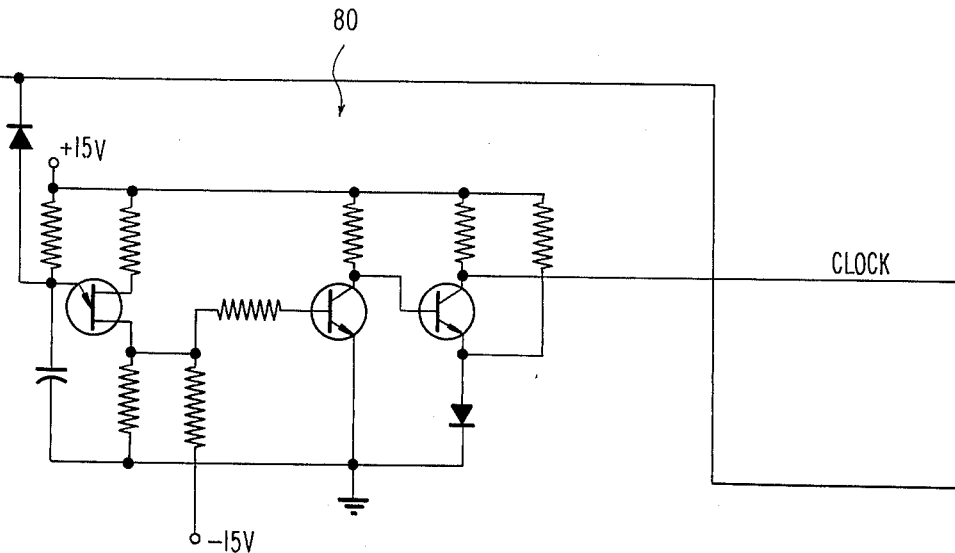
Figure 3D:
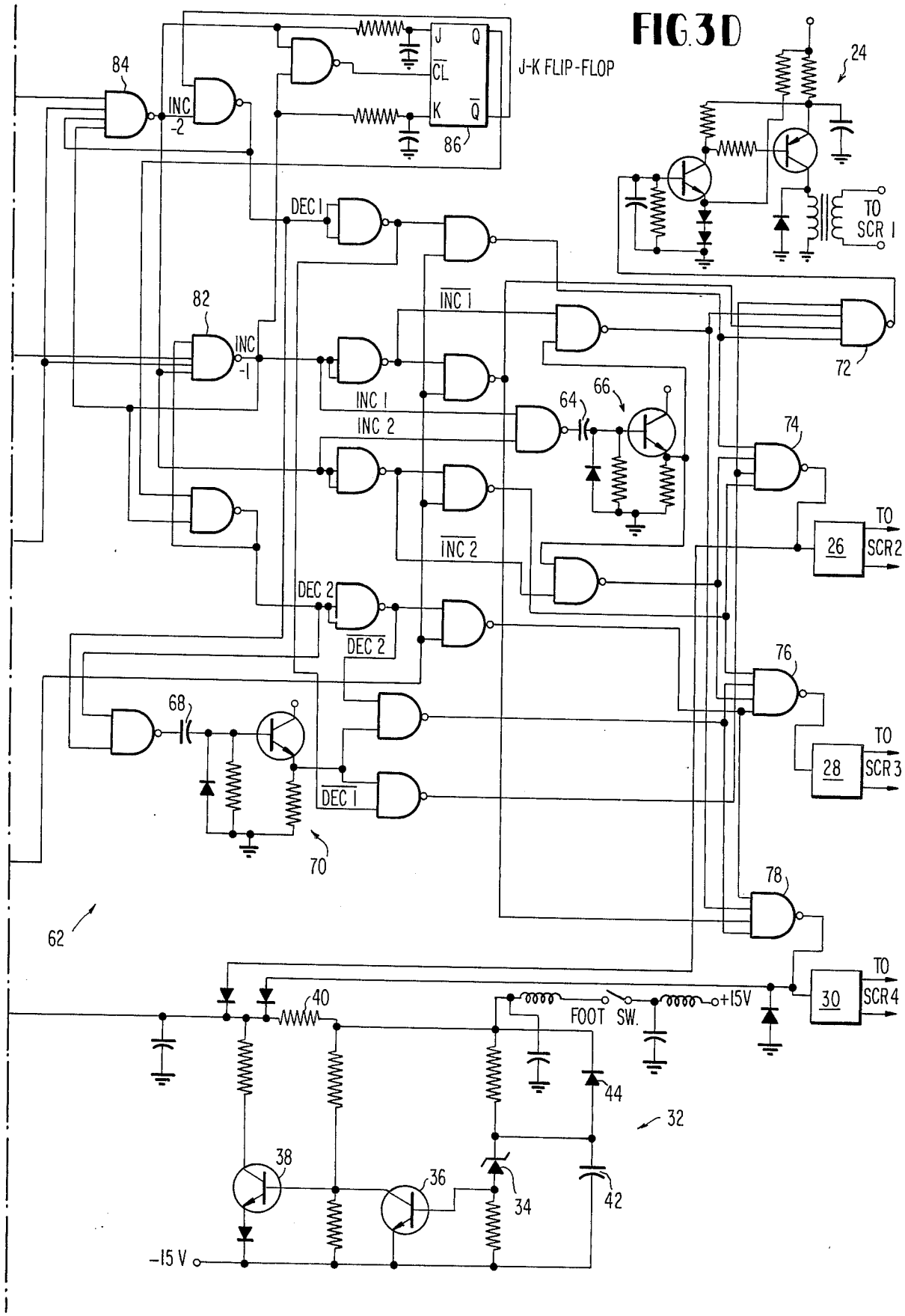

My novel adaptive control circuit operates from $\pm 15$ volt d.c. buses as is shown in more detail in the detailed circuit diagram of FIG. 3.

The actual welding current I is detected by a current sensing means 214 which, for example, may be a winding carrying the welding arc current and wound on an iron core, usually a toroid, with an air gap in the resultant magnetic circuit. A Hall effect device is located in the air gap and provides an output signal proportional to weld current. The signal is amplified by a current signal circuit 216 to provide an output voltage level which is termed the $I_{FB}$ signal.

A welding reference current is determined by adjusting a reference current potentiometer 218 which produces a voltage level $I_{REF}$ which is proportional to the set current. The $I_{FB}$ and $I_{REF}$ signals are compared in a current regulator 220 whose output is an error signal $E_1$ which is proportional to the difference between $I_{FB}$ and $I_{REF}$. This signal is applied to the input of a hysteresis switch 222 whose output is either high thereby calling for a welding current increase by the chopper 202, or low thereby calling for a welding current decrease. An increase state in the chopper consists of both SCR's in adjacent arms on one side of the bridge being on. A decrease state consists of a pair of SCR's in opposite arms of the bridge being on.

When the voltage level $E_I$ (i.e. $I_{REF} - I_{FB}$) exceeds the predetermined $\Delta I$, then the output of the hysteresis switch 222 is driven low to produce a decrease (dec) pulse which is steered by logic circuits 224 to the appropriate pair of pulse amplifiers 226 whose outputs are connected to a corresponding pair of SCR's in the bridge 202. This pair of SCR's is gated into a conducting state by the outputs of the pulse amplifiers, thereby causing the chopper to be commutated into an off condition, which does not interrupt the weld current but causes it to decrease in a ramp fashion since the inductor 206 must use its stored energy to supply the arc.

When the welding current falls below the reference current level by a difference $\Delta I$, the voltage level $E_I$, which is proportional to $\Delta I$, goes low, thereby driving the output of the hysteresis switch 222 high to produce a welding current increase (inc) pulse which is steered by the logic circuits 224 to the appropriate pair of pulse amplifiers 226 whose outputs gate on a corresponding pair of SCRs to reconnect the 80 volt d.c. bus to the inductor 206, causing current to increase in a ramp fashion since the arc voltage is well below 80 V d.c. bus 200.

Consequently, the 80 volt d.c. supply is continually chopped to produce an average welding current I whose peak value continuously ramps between $\pm\Delta I$ above the reference current at an adaptive rate determined by the time $t_{inc}$ it takes to ramp up $\Delta I$, and the time $t_{dec}$ to ramp down $\Delta I$, where $t_{inc} = \Delta IL/(80V - E_{arc})$ and $t_{dec} = \Delta IL/E_{arc}$.

The set or reference operating voltage is determined by adjusting an $E_{REF}$ potentiometer 228 which produces a voltage level $E_{REF}$ proportional to the reference voltage. This voltage is compared in an amplifier 230 with a voltage level $E_{FB}$ which is proportional to the actual arc voltage $E_{arc}$. The output of amplifier 230 is a voltage $K(E_{REF} - E_{FB})$ which is coupled through an adjustable slope control rheostat 232 to the top of the $I_{REF}$ potentiometer 218, thereby modifying the $I_{REF}$ voltage level as the arc voltage varies.

Adjustment of the slope control rheostat 232 provides a plurality of volt-ampere characteristics or slopes through a given set point without loss of the original set point to the operator.

An under-voltage protection circuit 234 is connected to the pulse amplifiers 226 in order to prevent the SCR's in the chopper bridge 202 from being fired until the control circuit power supplies are up to the normal values of ± 15 volts. The details of circuit 234 will be presented below.

A back-up clock 236 is coupled to logic circuits 224 to provide bursts of clock pulses for assuring the turn on of the selected SCR's in the chopper bridge 202 and also to insure that they will stay on during a particular current increase or current decrease state.

Another input to the logic circuits are INC1 ENABLE and INC2 ENABLE levels which assist in controlling the steering of the SCR gating pulses to assure the proper gating sequence of the SCR's in the chopper bridge 202. These signals are derived from a comparator 238 which compares a voltage $E_{CAP204}$ with the $I_{FB}$ voltage. $E_{CAP204}$ is proportional to the voltage across the commutating capacitor 204 in the bridge 202, and the outputs of comparator 238 assure that the charge on the commutating capacitor is adequate to provide the desired commutation action, i.e. turning off the SCR's in proper sequence.

An anti-yelp circuit 240 may also be connected to the top of the $I_{REF}$ potentiometer 218. This circuit is also described in detail below and functions to create a rapid reduction in the welding current at very high arc voltages.

Figure 2A:
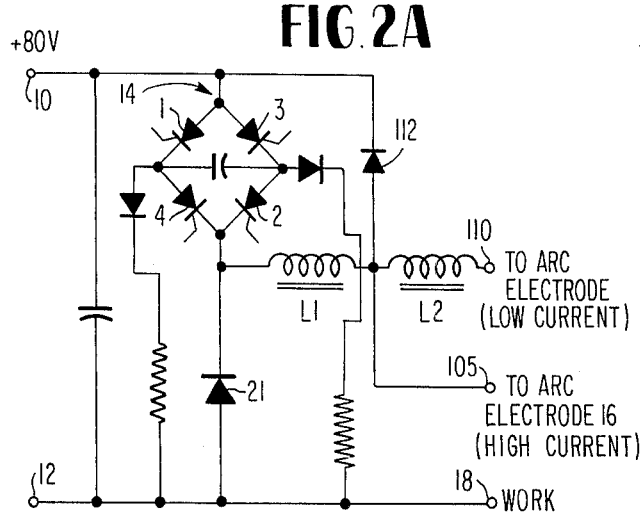
FIGS. 2A, 2B, 2C, 2CC, 2D and 2E are schematic diagrams of various chopper circuits which may be used in the adaptive control system.
Figure 2B:
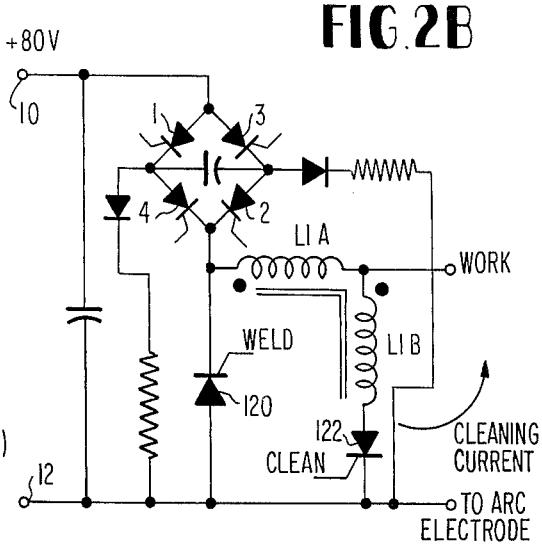
Figure 2C:
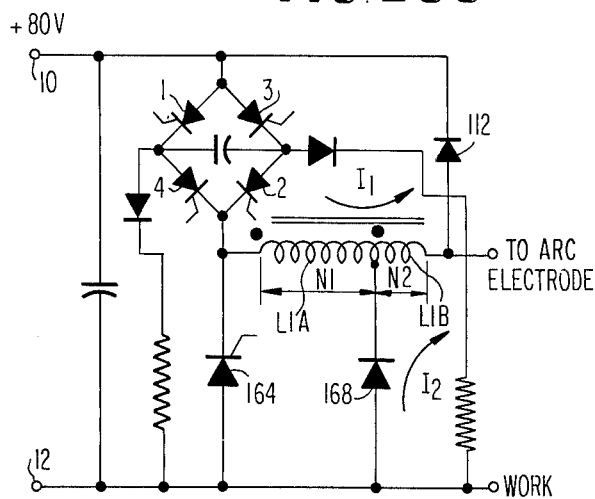
Figure 2C:
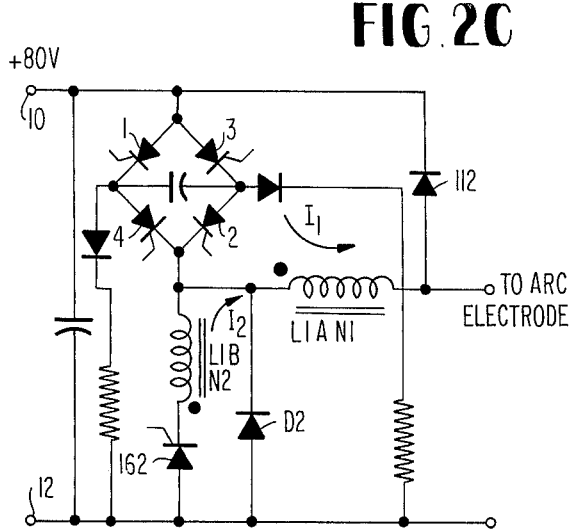

FIGS. 2A, 2B, 2C, 2CC, 2D and 2E are schematic circuit diagrams of preferred embodiments of the power circuitry of the invention wherein semiconductor devices are employed as electronic switches in a chopper circuit to provide rapid and accurate adaptive control of a welding arc.

A direct current potential of 80 volts, conventionally obtained from an A.C. power source, a transformer and a rectifier, is applied across input terminals 10 and 12 across which is connected a chopper circuit 14 which controls the power applied through an output inductor $L_1$ to supply a high current to an arc formed between the welder electrode 16 and a workpiece 18. When a low current arc is desired, electrode 16 is connected to low current terminal 19 in which case the welding current flows through inductors $L_1$ and $L_2$ connected in series.

The electronic switch or chopper 14 includes four switches, such as thyristors of SCR's 1, 2, 3 and 4, connected in a bridge configuration so that simultaneous conduction of two thyristors on the same side of the bridge connects inductor $L_1$ to the 80V supply. This is termed a current "increase" mode. When switches 1 and 4 are conducting together, the bridge is said to be in the "inc-1" state. The simultaneous conduction of switches 2 and 3 is termed the "inc-2" state. Simultaneous firing of non-adjacent thyristors on opposite sides of the bridge (e.g. thyristors 1 and 2 or thyristors 3 and 4) will turn off a current "increase" mode and insert the chopper commutating capacitor 20 in series with the 80V supply and $L_1$, thus causing the d.c. current through the bridge to go to zero. The inductive current of inductor $L_1$ continues to flow through the arc and the free-wheeling diode 21 when the bridge is turned off.

The basic power circuit of FIG. 2A is used for the SMAW process, GTAW process, and GMAW process. The circuit of FIG. 2B is used for asymmetrical gas shielded tungsten arc welding.

Variations of the power circuitry that are useful in specialty welding are shown in FIGS. 2C, 2CC, 2D and 2E.

A preferred embodiment of a control circuit for adaptively controlling the power circuits of FIGS. 2A and 2B in response to arc conditions is illustrated in FIG. 3. The minor additions to the control circuit of FIG. 3 to control the power circuits of FIGS. 2C, 2CC, 2D and 2E will be obvious from the following description of the power circuit operation.

The operation of the system for shielded metal arc ("stick") welding follows. When power is initially applied, an undervoltage protection circuit 32 prevents SCR's 2 and 4 from being fired until the control circuit power supplies are up to normal value. This is accomplished by clamping to ground the inputs to the pulse amplifiers 26 and 30 which are connected to the gates of SCR 2 and 4 in the chopper circuit 14. This clamp is removed when the supplies exceed the voltage of the zener diode 34 connected to the base of a first transistor 36 whose collector is connected to the base of a second transistor 38. Turning on of the first transistor 36 turns off the second transistor 38 and removes the clamp. A small degree of hysteresis is added by connecting a resistor 40 in a divider configuration to raise the voltage seen by the zener diode 34 as the second transistor begins to unclamp. This provides fast switching and eliminates jitter if the control supply is marginal in amplitude. A capacitor 42 is connected from the cathode of the zener diode to the −15V supply to provide a safe delay on start up to allow the control circuit to settle. A diode 44 connects the capacitor to +15V to provide a fast discharge or reset of the circuit 32.

SCR's 2 and 4 are thus prevented from being gated any time the control bus goes below the undervoltage limit determined by zener diode 34. This allows SCR's 1 and 3 to be gated, but with SCR's 2 and 4 not gated, the bridge 14 will simply turn off and stay off. This action will be clear from the following description of the normal SCR gating sequence.

With selector switch $S_1$ in the "stick" position and the $I_{REF}$ potentiometer 50 set at a desired welding current levle, but with no welding current yet flowing, a positive or high $I_{REF}$ voltage will be applied to the input of a control amplifier A3, thereby causing its output to go low.

The output of amplifier A3 is coupled to the input of amplifier A4 which operates as a hysteresis switch. A3 going low will drive A4 high. When the output of A4 is high, in order to switch it to low, the signal from A3 appearing on A4 input 52 must go higher than the divided output of A4 that is fed back to the non-inverting input 54 of A4. This feedback voltage is limited to a single diode drop by the diode 56 connected from the noninverting input 54 of A4 to ground. When A4 is low, the non-inverting input 54 of A4 is pulled below ground by the welding current feedback signal $-I_{FB}$. Therefore, the nature of A4 is a hysteresis switch with a variable width that is a function of welding current.

Thus, A3 operates as a current regulator by comparing a reference level $I_{REF}$ with a level $I_{FB}$ proportional to the actual welding current, and producing a current error signal $E_I$ proportional to $I_{REF} - I_{FB}$ at its output, which drives A4. A high out of A4 is called a welding current "increase" signal; a low is called a current "decrease" signal. Therefore, the variable width hysteresis switch A4 adaptively controls the rate at which the source voltage is chopped by chopper circuit 14.

The value of voltage on the commutating capacitor 20 in the SCR bridge 14 is measured with differential amplifier A2 having its inputs connected across the capacitor. Depending on which polarity is on the capacitor, either $+E_{CAP}$ or its inversion $-E_{CAP}$ will be positive. These signals are compared in comparator 58 and 60, respectively, with a bias level and with $I_{FB}$. If $E_{CAP}$ is sufficiently larger than the bias and $I_{FB}$ signals to insure that the commutating capacitor 20 can turn off the conducting SCR's when required, an "INC ENABLE" signal for either the "inc-1" or "inc-2" state (depending on commutating capacitor polarity) will be generated as a high at the output of the corresponding comparator. A small positive feedback signal around each of the comparators provides enough latching to avoid jitter. The feedback paths are identified by reference numerals 59 and 61, respectively.

The presence of an "increase" from A4 and an "INC ENABLE" from one of the comparators are two of the necessary conditions to permit gating the SCR's to place chopper circuit 14 in the "increase" mode, as previously defined. In addition to the steering provided by the proper "INC ENABLE" signal, the "inc-1" state is used to inhibit the "inc-2" state from being activated, and conversely "inc-2" inhibits "inc-1". This is done because, for the chopper 14 to operate successfully as an adaptive control, an "increase" mode must be followed by a "decrease" mode in order to commutate off the "increase" mode before another "increase" mode is permitted. Logic circuits 62 respond to the outputs of A4 and comparators 58 and 60 to generate "dec-1," "inc-1," "inc-2" and "dec-2" signals, which selectively control the states of chopper 14 by driving the appropriate pulse amplifiers 24, 26, 28 and 30 which in turn gate the corresponding SCR's in chopper 14.

Similarly, a "dec-1" state inhibits an "inc-1" from being activated, because the proper state sequence is:

| State | Conducting SCR's |
|-------|------------------|
| dec-1 | 1 & 2 |
| inc-1 | 1 & 4 |
| dec-2 | 3 & 4 |
| inc-2 | 2 & 3 |
| dec-1 | 1 & 2 |

Therefore, a low "dec-1" signal ("dec-1" on) will inhibit an "inc-2" state, and a "dec-2" signal will inhibit an "inc-1" state since this would be out of sequence.

The proper sequence is maintained by the illustrated arrangement of NAND gates forming the logic circuits 62. This interlocking may appear redundant in view of "INC ENABLE" steering, but it has been found highly desirable in preventing misfiring due to noise tending to scramble the states.

With either "inc-1" or "inc-2" on, i.e. low, a pulse will be generated via coupling capacitor 64, shaped by a pulse shaper 66, and fed to the appropriate pulse amplifiers and thence to the corresponding SCR gates Similarly, with either "dec-1" or "dec-2" on, pulse will be generated via capacitor 68 and pulse shaper 70 and fed to the pulse amplifiers and thence to the corresponding SCR gates in accordance with the above table Such an arrangement keeps the number of coupling capacitors and emitter follower transistors in the pulse shapers to a minimum, since only one of each is required for both "incs" and one for both "decs". After generation of an "inc" or "dec" pulse, the pulse is steered by logic circuits 62 to the appropriate pulse amplifiers to gate the corresponding SCR's in chopper bridge 14 in accordance with the above table. A separate channel is needed for the "dec" signals, since a "dec" signal may arrive arbitrarily soon after an "inc," and the "inc" coupling capacitor 64 may not have reset in time.

The last stage before each of the transistor pulse amplifiers 24, 26, 28 and 30 consists of a corresponding 4-input NAND gate 72, 74, 76 or 78 whose output goes high when its associated "inc" or "dec" pulse is coupled to it, and also goes high at a clock pulse frequency provided by a UJT clock oscillator 80 throughout the duration of an "inc" or "dec" state pertaining to that channel of the pulse amplifier. The SCR gating is thus produced by an instantaneous pulse when a change occurs between "inc" and "dec" states, and this gating pulse is backed up by a burst of clock pulses to insure the selected SCR's will go on and stay on during the life of the particular state.

The "inc" states, "inc-1" and "inc-2," at the outputs of NAND gates 82 and 84 are used to set up a JK flip-flop 86 which in turn insures that the proper "dec" state will follow each "inc" state. Absence or removal of a particular "inc" state automatically creates the proper "dec" state. This action can occur either by the welding current, and thereby the $I_{FB}$ signal, increasing to a value high enough relative to the $E_{CAP}$ signal to disable the "INC ENABLE" signal, or by the output of A3 going high as the welding current builds up during an "increase" state and causing the IFB signal to become larger than the $I_{REF}$ signal, thereby driving A4 low and removing a necessary condition for an "increase" state.

Upon the occurrence of a "decrease" or low at the output of A4 logic circuits 62 insure the proper gating of the appropriate pair of cross corner SCR's in bridge 14 in accordance with the above table. Once a decrease state has begun, the capacitor 20 must be completely reverse charged before an "increase" state will be enabled or before another "decrease" can occur. This result is due to the logic interlocking performed by logic circuits 62 which forces a "dec" to be followed by the proper "inc" which itself cannot be enabled until the charge on capacitor 20 is of the proper polarity and magnitude for commutation.

This degree of forced lock stepping from state to state is required since, in the vicinity of the welding arc and switching SCR's and with frequently used high frequency arc initiation and stabilization circuitry, there is a great deal of electric "noise" that may interfere with sensitive electronic circuitry of the adaptive control system.

It is important to note that the frequency of switching from state to state is not on the basis of a clocked frequency, but rather is determined naturally or adaptively by the time it takes for the welding current to overshoot and undershoot the $I_{REF}$ level by $\Delta I$ amount, where $\Delta I$ is the actuating error necessary to flip or switch the output of A4 between high and low outputs.

The arc voltage $E_{ARC}$ is always less than the 80V bus, so that in an "increase" mode, the welding current increases at a rate of $(80V - E_{ARC}/L_1)$. In a "decrease" mode, the arc voltage decays at a rate of $(-E_{ARC}/L_1)$. When initially starting, voltage can be developed on the commutating capacitor 20 since there is a path for conduction with "dec" SCR's 1,2 or 3,4 gated. Touching the work 18 with the electrode 16 (or jumping the gap with high voltage RF to create a plasma) will initiate an "inc" state and chopping will begin at an adaptive rate determined by the time required for the welding current to deviate from the reference current by $\Delta I$, i.e. the time required for $I_{FB}$ to deviate from $I_{REF}$ sufficiently to switch the output of A4.

Arc voltage $E_{ARC}$ is measured with differential amplifier A1 which produces an output signal $E_{FB}$ proportional to $E_{ARC}$.

The reference value $I_{REF}$ of the welding current is modified in proportion to the difference between the set value $E_{REF}$ of arc voltage and the actual arc voltage $E_{ARC}$. The reference arc voltage $E_{REF}$ is determined by adjusting the $E_{REF}$ potentiometer 86. This modification is accomplished by comparing $E_{FB}$ with $E_{REF}$ in an amplifier A6. The difference $E_{REF} - E_{FB}$ appears at the output of A6 and is coupled to the $I_{REF}$ potentiometer 50 through a slope rheostat 88. The $I_{REF}$ signal is thus modified by arc voltage deviations from the set arc voltage value, and the extent of the modification is determined by the setting of the slope rheostat. For a given slope setting the percent change in $I_{REF}$ as a function of arc voltage deviation is the same for all settings of the $I_{REF}$ potentiometer 50.

By adjusting the slope control rheostat 88, any volt-ampere characteristic can be obtained, and all of the characteristics for a particular set point run through the set values of arc voltage and current. Set voltage and current are those corresponding to normal levels during a particular welding process, and are set according to the type and diameter of electrode to be used by adjusting the $E_{REF}$ and $I_{REF}$ potentiometers.

Figure 4:
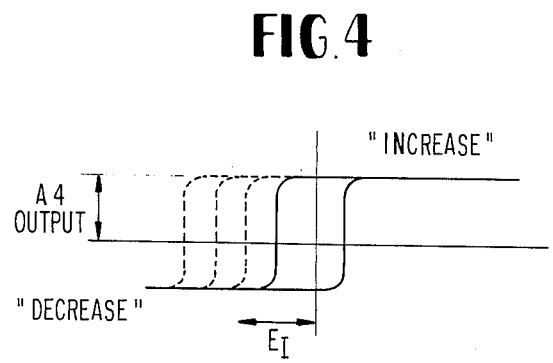
FIG. 4 is a graph illustrating the operation of the hysteresis switch employed in the invention.
Figure 4A:
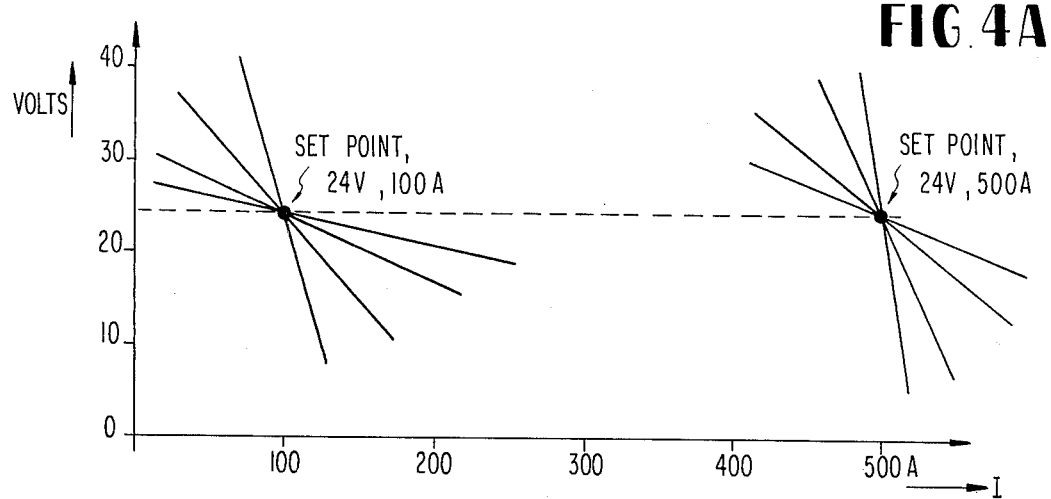
FIGS. 4A and 4B are graphs illustrating the variable slope control feature of the invention.
Figure 4B:
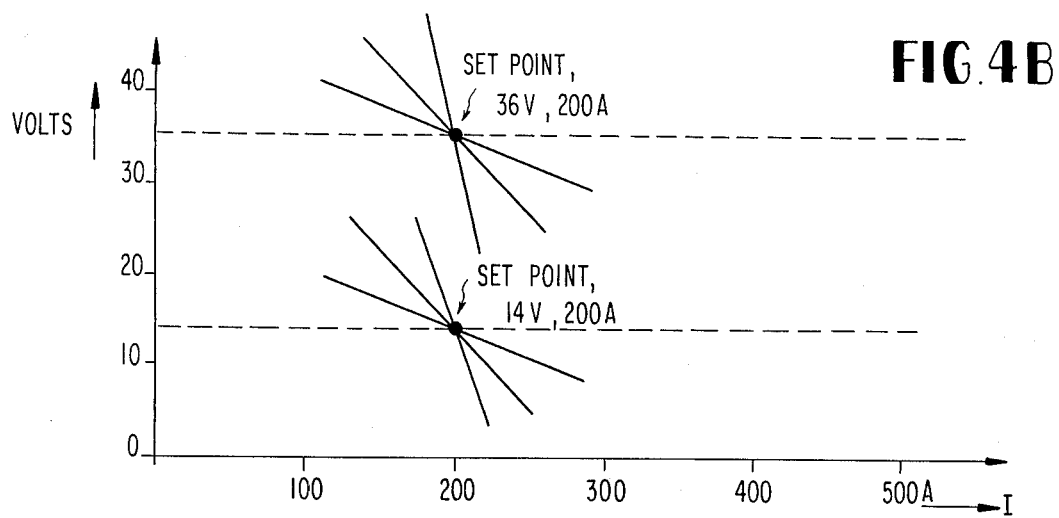

FIGS. 4A and 4B illustrate examples of particular set points and also show the manner in which the slope of a volt-ampere characteristic can be changed through each set point. For example, in FIG. 4A, there are illustrated set points of 24 volts, 100 amperes and 24 volts, 500 amperes. In FIG. 4B, set points of 36 volts, 200 amperes and 14 volts, 200 amperes are illustrated. For each set point, a plurality of different characteristic curves, each running through the set point, are available by adjusting the slope potentiometer 88.

In addition, a dig voltage level is provided. This is obtained by causing the current reference $I_{REF}$ to increase rapidly as the arc voltage $E_{ARC}$ falls below a predetermined dig voltage level, such as 5 to 20V.

This dig voltage level is determined by adjusting a dig potentiometer 90 to provide an $E_{DIG}$ signal proportional to a desired dig level and comparing this signal with the actual arc voltage signal $E_{FB}$ in an amplifier A8. The wiper arm of potentiometer 90 is mechanically ganged with the wiper arm of potentiometer 50. The output from A8 is A.C. coupled by a capacitor 91 to the tip of $I_{REF}$ potentiometer 50 to modify $I_{REF}$ when the dig voltage level is reached such that $I_{REF}$ and the welding current increase rapidly at this level. By dividing the feedback signal around A8 with an RC divider 93, A8 has two time constants to provide for approximately 30 milliseconds a transient dig current which is about 200% of the set current, while the long time constant dig current is about 150% of the set current for 300 milliseconds. The steady state current follows the selected volt ampere slope.

Figure 5:
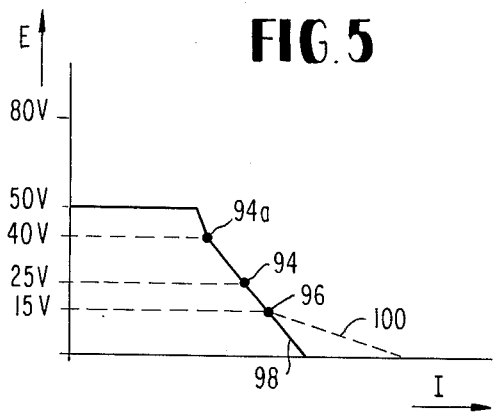
FIG. 5 is a graph illustrating the dig voltage control feature of the invention.

FIG. 5 is a graph illustrating the effect of A8 in providing a dig voltage level. The normal set point 94 is 24 volts, 100 amperes. The point 96 identifies a dig voltage level of approximately 17 volts. Curve 98 identifies the steady state current, and curve 100 identifies the transient dig current. At point 94a, which is approximately 1½ time the set arc voltage, the curve is made twice as steep as below 94a to prevent easy arc outages when the operator manipulates arc length. Further, at very high arc voltages, such as 50V, the output characteristic is controlled to create a rapid reduction in welding current. This function is achieved with amplifier A9, called an anti-yelp circuit, because without this control the arc makes a loud yelp as the operator withdraws the electrode. The yelp is kept small by using A9 to compare a portion of the arc voltage $E_{FB}$, as determined by a potentiometer 102, with a predetermined value, fixed by a voltage divider 103, and switching A9 full negative, thereby extinguishing the welding current by transiently driving negative the $I_{REF}$ signal applied to the input of A3. The output of A9 to AC coupled via capacitors 99 to the top of the $I_{REF}$ potentiometer 50. A9 is provided with a positive feedback path 101 to provide substantial hysteresis and definite arc extinction once it is begun.

Under open circuit conditions a small current reference connected directly into A3 maintains the system in an increase state, and the output at 80V. An RC network 104 connected from the terminal 105 to the negative supply bus provides a load for the bridge SCR's in the open circuit case and also provides an instantaneous source of energy for sparking through flux and dirt when a stick weld is begun.

The same circuit is also used for providing a hot start by utilizing the fact that the open circuit output voltage is higher than the yelp level, and, hence, in the no load mode, A9 output is negative. When the operator restrikes the arc, A9 goes and remains positive, thereby releasing $I_{REF}$ and coupling a positive boost to $I_{REF}$ via a diode 106 and an RC network 108 between the output of A9 and the $I_{REF}$ potentiometer 50.

For normal high current welding processes, the welding electrode 16 is connected to the high current stud 17 and the welding current flows only through the output inductor $L_1$. A current sensing magnetic toroid 110 inductively linked to the welding current by one or more turns of the output conductor supplies to a Hall device 112 in current signal circuit 114 a magnetic flux proportional to the welding current. Hall device 112 is located in the air gap of the toroid and produces a voltage proportional to the magnetic flux which in turn is proportional to the welding current. The Hall device is conencted in circuit 114 which amplifies the Hall voltage and produces the voltage level $I_{FB}$ which is proportional to the actual welding current.

For very low currents, useful for small diameter electrodes and for GTAW welding, a second inductor $L_2$ is connected between the high current output stud 17 and a second low current output stud 19. Additional (e.g. three) turns 111 are energized on the magnetic toroid when welding current flows through the inductor $L_2$.

As an example, the signal $I_{FB}$ is the Hall device output amplified by a differential amplifier A10 which provide IV per 100 amps when the high current output stud is used and automatically is rescaled to 1 volt per 25 amperes when the low current output stud is connected to the electrode. The current reference is automatically rescaled from 50 to 500 amps on the high stud 17 to approximately 12 to 125 amps on the low stud 19 by virtue of the feedback change.

The diode 113 is connected from terminal 105a to the 80 volt bus. This prevents more than 80 volts from appearing at either output stud 17 or 19. The clamp diode 113 allows the commutating pulse, generated by the discharge of the commutating capacitor 20 into inductor LR, to ring around and recharge the capacitor. This reduces the ripple in the output current.

Gas tungsten arc welding (GTAW) on non-aluminum material is essentially as described above for covered electrode welding, with the optional addition of periodic pulses from a function generator coupled to $I_{REF}$ to obtain the well known advantages of columnation, penetration, and stirring obtained by arc pulsation.

For GTAW on aluminum the operation is much as described for non-aluminum with and without pulses coupled to $I_{REF}$. However, on aluminum it is desirable to periodically reverse the current flow to clean off oxide. To this end, the free wheeling diode 21 of FIGS. 2A and 3 is replaced by a weld SCR 120 as shown in FIG. 2B. SCR 120 is gate pulsed each time the output inductor attempts to free wheel following a "decrease" signal. The weld SCR 120 thus performs the same function as the freewheeling diode 21 during normal forward polarity welding. However, by not gating the "weld" SCR and allowing a substantial voltage to be induced by a first inductor winding $L_{1A}$ following a "decrease" (the inductive energy is very much larger than the commutating capacitor energy storage, and the inductor rapidly charges the capacitor if no free wheeling path is allowed following "decrease"), an alternate path for free wheeling is provided by a second inductor winding $L_{1B}$ tightly coupled to the first winding $L_{1A}$. This path is allowed by gating the "clean" SCR 122. The welding plasma provides a low impedance, low voltage path for reverse direction current flow via this second winding.

Additionally turns through the toroid associated with the Hall device 112 in the feedback current signal circuit 114 are provided in the "clean" path so that the $I_{FB}$ signal is actually "NI" feedback, viz. ampere turn feedback. This provides a direct reading of the inductor field or energy storage. When the "clean" pulse depletes the inductor energy by a ΔNI amount, the "increase" mode is refired in the same manner that the welding current was regulated for stick welding, as described above. This prevents excessive depletion of the inductor energy that could cause the arc to go out.

When an "increase" mode is refired, the low voltage plasma maintains the electrode potential at approximately 24 volts. Therefore, approximately 56V is impressed across the forward conduction winding $L_{1A}$, and a voltage is thereby induced in the "clean" winding $L_{1B}$ such that the current will attempt to flow backward through the "clean" SCR 122, thereby commutating it off.

The turns ratio between the "weld" winding $L_{1A}$ and the "clean" winding $L_{1B}$ need not be 1:1. The "clean" pulse can therefore be a higher current pulse for optimum cleaning.

Figure 6:
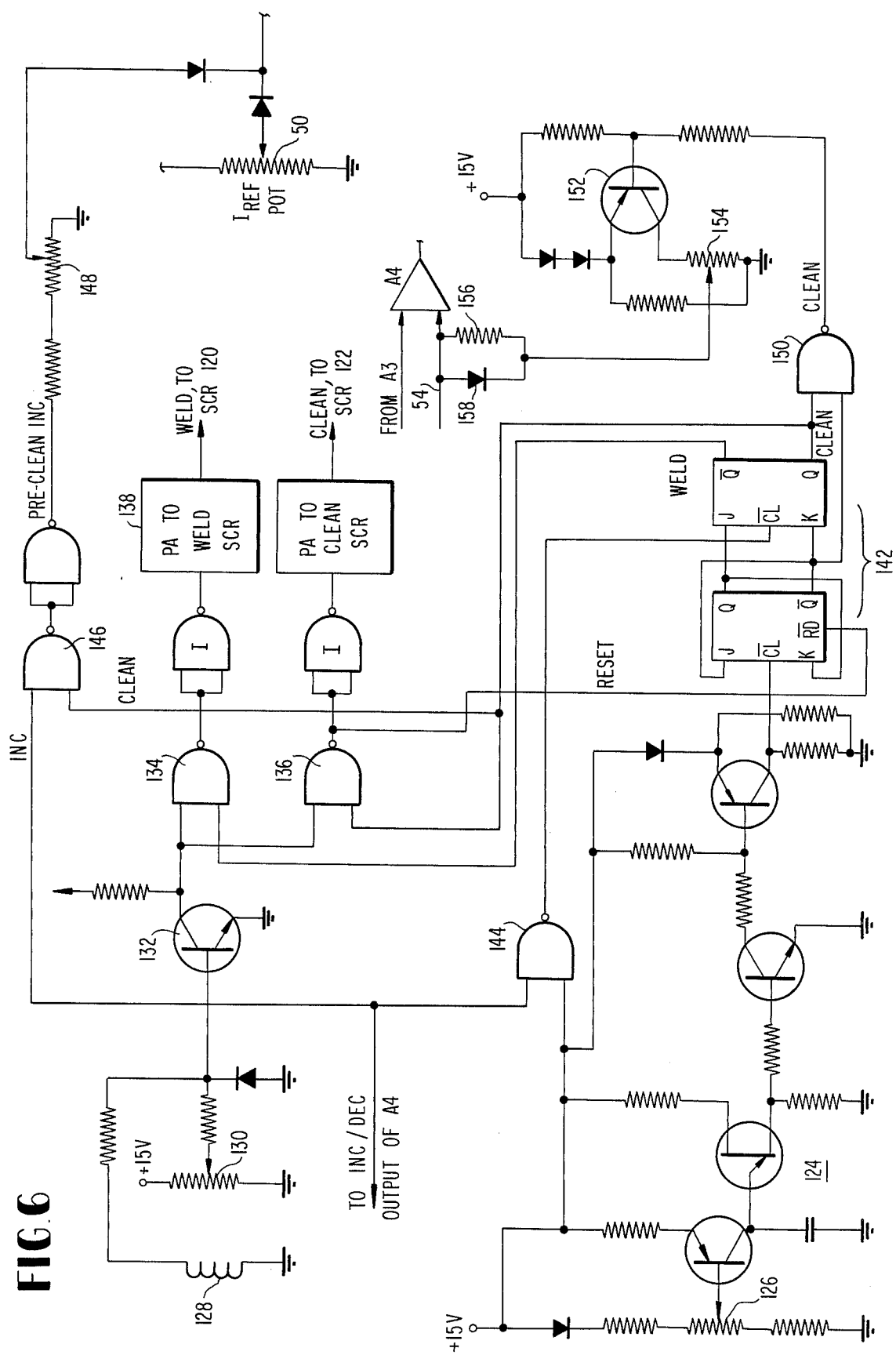
FIG. 6 is a schematic circuit diagram illustrating the manner in which the adaptive control circuit of FIG. 3 is modified to provide oxide cleaning of the welding electrode in shielded tungsten arc welding.

Gating of the "weld" and "clean" SCR's is controlled by the circuit illustrated in FIG. 6. The repetition rate of the "clean" gate pulse is determined by a variable frequency UJT clock oscillator 124 whose frequency is varied by adjusting a potentiometer 126 to produce, typically, 10 to 500 pulses per second. The logic for firing the "clean" SCR consists of obtaining a voltage proportional to the inductor induced voltage by means of a pickup winding 128 which is tightly coupled to inductor $L_1$. When this voltage reaches a predetermined value, which can be constant, as determined by a potentiometer 130, or which can be proportional to a process variable, a normally-conducting level detector transistor switches off to produce a positive transition at its output. NAND gates 134 and 136 provide steering to allow the leading edge of this transition to gate either the "weld" or "clean" SCR via the pulse amplifiers 138 and 140, respectively. The determination of which shall be gated is made by setting a two-stage JK flip flop 142 to steer the transition pulse to the "clean" amplifier 140 following each pulse from the clock oscillator 124. When the "clean" pulse is delivered from NAND gate 136, it also is fed to the $\overline{RD}$ terminal of the first stage of the flip flop to reset the flip flop so that "weld" pulses are produced until the next clock oscillator pulse arrives. The change of state from "weld" to "clean" and vice versa is made following initial setting of the flip flop, by the leading edge of the output of the hysteresis amplifier A4 going from "dec" to "inc." This function is performed by a NAND gate 144 whose upper input is tied to the "inc/dec" output of hysteresis amplifier A4 and whose output is tied to the $\overline{CL}$ input of the second stage of flip flop 142. This arrangement allows a great deal of time for the transition to take place, since the "weld" or "clean" SCR does not conduct until after a "dec" following an "inc".

It is also often desirable to increase the reverse cleaning current. To accomplish this, a NAND gate 146 is connected via a potentiometer 148 to the wiper arm of the $I_{REF}$ potentiometer 50. The upper input of the NAND gate is tied to the inc/dec output of A4, and its lower input is tied to the Q or CLEAN output of the second stage of flip flop 142. Consequently, when CLEAN and "inc" are both up, the NAND gate produces a PRE-CLEAN INCREASE pulse which boosts the level of the $I_{REF}$ signal.

Another optional feature is one which provides for widening of the clean pulse relative to the normal width of current pulses permitted by the action of hysteresis switch A4. A NAND gate 150 has one input connected to Q output of the second stage of flip flop 142 and its other input connected to the $\overline{Q}$ output of the first stage. The output of NAND gate 150 is connected to the base circuit of a normally off transistor 152. The transistor collector is connected through a potentiometer 154 to the junction point 156 of the diode-capacitor network 158 which is connected to the lower input of A4. In this modification, the point 156 is not permanently grounded as shown in FIG. 3, but instead is connected to the wiper arm of potentiometer 154 so that the potential of point 156 may be set at ground potential or above. When a CLEAN pulse is produced by NAND gate 150, transistor 152 is turned on, thereby raising the bias potential on A4 so that A3 will have to rise higher than previously to switch A4 and consequently the CLEAN pulse supplied by the chopper is wider than when point 156 is grounded.

The result is a simple but very effective reversible current source with forward and reverse currents which can be 1:1 or other desirable ratios.

In the continuous wire feed welding process, three mehcanisms of metal transfer are recognized, namely spray transfer, globular transfer and dip transfer. Spray transfer yields the greatest heat energy to the weld zone which places a limitation on the maximum current density that can be employed in a given situation. In conventional spray welding a voltage source utilizing adaptive control is created by chopping voltage rather than current. This is done by comparing the arc voltage signal $E_{FB}$ with a predetermined level at A5 whose output is connected through a voltage divider 160 to $I_{REF}$. When the arc voltage rises above this level by a $\Delta V$ amount (which it will do since "inc" is backed up by an 80 volt source and the selected level is never over 40 volts, and therefore the arc voltage will ramp upward when "inc" is fired), the $I_{REF}$ signal is abruptly reduced to a low value, causing the system to go into the "dec" mode. When the arc voltage undershoots by a small $\Delta V$ amount typically less than 5%, $I_{REF}$ is abruptly raised to a value corresponding to a current well above the transition current level (transition current is the welding current density which is sufficient to pinch off the melting electrode, thereby creating very fine droplets, referred to as spray). Under normal circumstances $I_{FB}$ does not exceed this $I_{REF}$; instead the arc voltage overshoots the set value of voltage first and removes $I_{REF}$. Firing of "inc" and "dec" is thus on the basis of $\Delta V$, but if the welding electrode should touch the work, the system automatically reverts to current chopping if $I_{FB}$ exceeds $I_{REF}$.

Arc voltage is constrained to $E_{REF} \pm \Delta V$, whereby the system corresponds to a class 1 servo with no average error or regulation.

An intermittent spray transfer, created by the use of adaptive control of the power source, allows very high current densities for great penetration without the disadvantages of excessive overall heat energy transfer to the work, thus creating in effect a "cooler" arc. Contrary to other pulsing methods, adaptive control is automatically self-regulating and can produce short intervals of extremely high current densities and expand the use of the spray transfer welding process to areas normally not suited for this process. This method of welding using adaptive control is also controlled by $\Delta V$ on either side of an $E_{REF}$, but with the $E_{REF}$ being set slightly lower than in conventional spray welding. $I_{REF}$ is switched from a high level to a low level when a large value of $\Delta V$ is exceeded; typically, $\Delta V$ is 50% of average voltage. The actual value of high and low $I_{REF}$ is proportional to wire diameter and is also calibrated on the basis of whether or not the material is aluminum (aluminum is considerably different from other materials in its thermal conductivity, mass, and transition current) The high current is selected well above the transition current and the low current well below.

Arc voltage is proportional to arc length. Intermittent spray can thus be viewed as an arc length regulator. The wire feed advances the electrode toward the work. When the arc length becomes less than a predetermined value, $I_{REF}$ is switched to high, and a constant current is chopped on the basis of $\Delta I$, and the wire is quickly burned back by spray transfer welding until the arc length exceeds a predetermined length. The current is then switched to low, and no droplet transfer occurs as the wire continues to advance and shorten the arc to below the lower limit. Spray is then initiated by switching to the high current, etc. The process is made possible by my novel automatic self regulating adaptive control system incorporated in the power supply. If the wire feed rate is increased, the system automatically remains in spray longer since the burn back must overcome the advancing wire speed. The low is naturally more brief since the wire advances more rapidly. On the other hand, if the wire feed is slowed down, the low lasts longer and the burnback is more brief.

The advantage of this system of intermittent spray transfer is that penetration is a function of current density, and high current density is intermittently provided. Yet the average heat is less than in continuous spray. The spray transfer may be 50% on, 50% off, for example. In continuous spray, the wire feed rate must be high enough so that the continuous current drawn is well above the transition current. This defines the minimum wattage obtainable with continuous spray since both voltage and current, determined by wire feed rate, are at necessary values. The intermittent spray process can provide the voltage and current necessary to create spray transfer on a duty cycle basis. Wire feed rate can be cut in half for example, from the continuous spray case, and wattage will be cut in half. Thinner material and out of position welding can be done more easily.

The extent of melting and penetration of the parent material is not simply proportional to average wattage as may be assumed. It is dependent on the efficiency with which the source energy is coupled to the work. This coupling is much greater during a high current condition. This greater coupling is due to several factors. One is that the arc itself has approximately zero incremental resistance. Sometimes it is actually negative. Therefore, a smaller percentage of source energy is lost in heating up the plasma. The plasma itself becomes smaller in diameter due to pinch effect at high current and burrows into the weld puddle delivering heat to the parent metal; the arc heat is thus more concentrated and a better heat transfer occurs due to burrowing. Also at high current the droplets of melted electrode are smaller, hotter, and are impelled toward the work by pinch off with greater speed, thereby causing puddle turbulence.

The intermittent spray transfer created by adaptive control therefore has the characteristics of "spray" as far as depth of penetration and depth-to-width ratio are concerned but effectively allows some cooling between bursts of spray so that vertical and overhead welding are not a problem. Since the high current value can be arbitrarily high, the depth of penetration can be very much greater than is possible in continuous spray, because in continuous spray higher current requires higher line speed which in turn requires faster welding than is practical due to the wire filler metal accumulation.

Intermittent spray using adaptive control differs from pulse arc welding in that synchronization with wire feed rate is inherent. In pulse arc welding, pulses are imposed at a given frequency (which may be selectable) but there is no assurance that the electrode has melted sufficient material prior to the pulse arrival to insure an optimum droplet and wattage coupling transfer. Pulse arc suffers from a change in wattage coupling to the work if wire feed rate varies slightly, and therefore the process is difficult to set up and maintain.

Another method of welding with continuous wire feed electrodes is dip transfer welding, generally referred to as "short arc," wherein the droplet of melted electrode is allowed to short out the arc. Using this system with adaptive control, voltage is chopped as in spray welding, and $I_{REF}$ is set high enough to insure sufficient pinch off of the shorting droplet, but is kept below a value that would result in excessive spatter. This is adjusted on the basis of wire diameter and aluminum or non-aluminum work.

For very light work, such as very thin aluminum sheet metal, a method similar to short arc and intermittent spray welding can be used. In this case, the arc is allowed to go out by reducing the current to zero following burnback. This is particularly helpful on aluminum because, to maintain arc directivity, it is normally necessary to keep arc current moderately high, even between sprays, or between dips in short arc welding. Aluminum does not emit electrons well when it is hot, and at low current a spot on the oxide adjacent to the weld will emit and keep the arc hung up on this spot; therefore, arc direction is not good.

With a moderately high background or minimum current the melting rate of the aluminum electrode is quite high, and it is not possible to obtain a cooler weld by slowing down the wire feed rate.

With the "very light" process there is no electrode melting between bursts of metal transfer, and hence the electrode feed rate can be very slow for a cool weld. When the wire touches the parent metal, a very short arc is created and arc directivity is assured. Following a burst of spray (which is intensely hot for a brief period and burns through oxide), the arc is turned off. By increasing the off periods by slowing down wire feed rate, very thin material can be welded by wire feed. In the prior art TIG welding would have been required, which is considerably slower.

The means for accomplishing the "very light" process are the same as for adaptive spray except the $I_{REF}$ during low is zero.

The chopper bridge 14 also serves as an output contactor. To this end a remote on-off pilot switch (not shown) is used to trip the undervoltage circuit 32 which steers pulses away from SCR's 2 and 4 and drives the current regulator A3 into a "decrease" state. The bridge is thus commutated off and left off. The oscillator capacitor of back-up clock 80 is also grounded to provide redundant safety by having all SCR's ungated in the steady state OFF condition.

Many other chopper circuits may be used as an electronic switch to achieve the above described process control without departing from the scope of the invention. It is essential only that the electronic switch can connect and disconnect $L_1$ from an electrical source. It is also possible to achieve the slope and set point control of the stick process using other power circuitry, for example a three phase controlled bridge rectifier, without departing from the scope of the invention.

Specialty welding requiring rapid changes in current level, such as square wave pulses, for columnation, penetration, cleaning, or the like, and also requiring a highly inductive current source for arc or current continuity can be obtained with the circuits of FIGS. 2C, 2CC, 2D and 2E, despite the apparent contradiction of rapid current changes from a highly inductive source.

FIG. 2C illustrates an additional winding $L_2$ having $N_2$ turns and connected in the free wheeling path for the purpose of obtaining a rapid decrease in current when going from "inc" to "dec." With a large output inductance $L_1$, the field strength is maintained as long as the ampere turns NI are maintained. Thus, a change from $I_1 N_1$ to $I_2 (N_1 + N_2)$ results in no loss of inductive energy, and only involves a change in the leakage reactance field which can be made to approach zero by bifilar winding. $I_2$ will be equal to $$I_1 \left( \frac{N_1}{(N_1+N_2)} \right)$$

and will reach this value in a few microseconds. A second free wheeling path allowing free wheeling on a 1:1 current basis can be provided in the form of a diode $D_2$. If the path including the additional $N_2$ turns is enabled by firing SCR 162, it will back bias and cut off the 1:1 path including diode D2.

FIG. 2CC illustrates two free wheeling paths, the thyristor 164 free wheeling path providing a 1:1 ratio for "inc" and "dec"; when the thyristor is not gated, "dec" current must flow through the diode 168 path with fewer turns, thereby creating a high output current since the conservation of energy requires stepless NI. $I_2$ will equal $$I_1 \left( \frac{N_1+N_2}{N_2} \right).$$

Figure 2D:
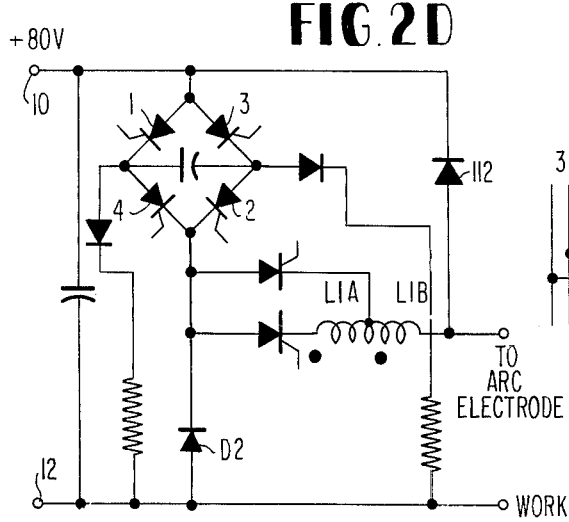

If the high or low pulse must be of arbitrarily long duration such that it could not be provided indefinitely by free wheeling without requiring an excessively large inductor, additional paths and windings can be provided in the "inc" path as shown in FIG. 2D.

The chopper circuits illustrated in FIGS. 2C and 2D can be combined to obtain any degree of control desired.

Figure 2E:
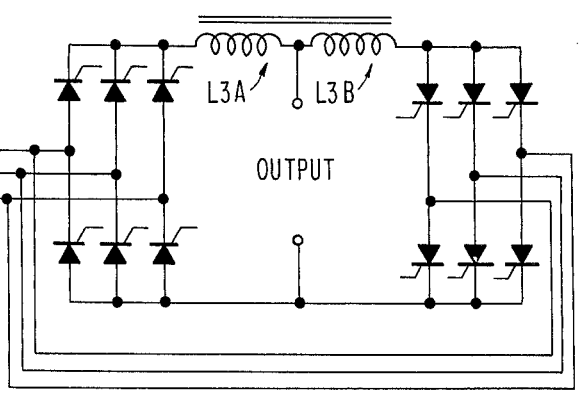

A variation that can be used for arc or resistance welding at high power levels is shown in FIG. 2E. In this case an inductor $L_3$ with two tightly coupled windings is driven by back-to-back phase controlled thyristor bridges connected to a 3-phase power supply. Arc or load current is reversed each time one bridge is fired to commutate the other bridge out. Field strength in the inductor never approaches zero as load current reverses, but actually increases during commutation. When a bridge is fired it is gated full on, producing several times arc or load voltage. This relatively high voltage is impressed on the winding closest to the bridge by reverse conduction through the load and induces a like voltage in the other winding, thereby back biasing the second bridge and turning it off. In addition the second bridge has its firing reduced to a pump back or regenerative condition, thereby assisting commutation. Following commutation, the new bridge has its conduction angle retarded to a fraction of the "full on" condition. One 3 phase firing circuit can be used by enabling or disabling outputs to the bridges as the program proceeds. "Full on" for commutation is obtained by gating all thyristor switches in one bridge simultaneously with a train of high frequency pulses.

While the invention has been particularly shown and described with reference to preferred embodiments thereof, it will be understood by those skilled in the art that various changes in form and details may be made therein without departing from the spirit and scope of the invention.

I claim:

1. A method of spray transfer arc welding wherein a welding electrode is continuously fed toward a workpiece and spray transfer occurs when the welding current exceeds a transition current level and no spray transfer occurs when the welding current is at a very low level, comprising:
   a. obtaining a measure of the actual length of the arc;
   b. predetermined maximum and minimum lengths of the arc;
   c. comparing the measure of the actual arc length with the predetermined minimum and maximum arc lengths, respectively;
   d. raising the welding current to a high value above said transition current level when the actual arc length decreases to said minimum arc length, and
   e. lowering the welding current to a low value, at which no spray transfer occurs, when the arc length reaches the maximum arc length due to the burnback of the welding electrode when the welding current was above the transition level; whereby the spray transfer is automatically turned on and off to self-regulate the arc length between the predetermined maximum and minimum lengths regardless of the electrode feed rate, and whereby the high value of controlled welding current can be arbitrarily higher than the transition current level and is independent of wire feed rate, and whereby the low value of controlled welding current level is arbitrarily low and also independent of the wire feed rate.

2. An arc welder control system responsive to the arc for automatically controlling a power source supplying welding current to the arc comprising: a D.C. voltage source for supplying welding current to an electrode spaced from a workpiece to be welded and having a voltage substantially higher than the maximum arc voltage, set point control means coupled between said source and said electrode for selecting a set point defined by a set welding current at a set welding arc voltage, feedback circuit means responsive to the actual arc voltage for maintaining said set current through the arc when the arc length corresponds to the set arc voltage, said feedback circuit means generating a first switching signal whenever the instantaneous value of welding current exceeds a reference current level by a predetermined deviation ΔI and a second switching signal whenever the instantaneous value of welding current falls below said reference current level by said predetermined deviation ΔI, and switching means coupled between said source and said electrode and switched in response to said second switching signal for coupling said source to said electrode to increase the welding current and switched in response to said first switching signal for decoupling said source from said electrode to decrease the welding current, whereby the welding current is continually switched between increase and decrease modes at a rate determined by the times required to reach the predetermined deviations respectively above and below said reference current level.

3. An arc welder control system as defined in claim 2 wherein said switching means is further responsive to the arc voltage to decouple said source from said electrode when the arc voltage exceeds a predetermined maximum voltage which is well below the source voltage.

4. An arc welder control system as defined in claim 2 wherein said feedback means further comprises comparator means responsive to a predetermined voltage deviation ΔV of the arc voltage from a reference arc voltage to produce third and fourth switching signals when said arc voltage respectively exceeds and falls below said reference voltage, means coupling said third and fourth switching signals to said switching means, and means for inhibiting the generation of said first and second switching signals whereby said switching means is switched at a rate dependent on said voltage deviation ΔV, rather than at a rate determined by the predetermined current deviation ΔI.

5. An arc welder control system as defined in claim 4 further comprising means responsive to a welding current deviation above a maximum ΔI for permitting said first and second switching signals to switch said switching means, whereby said switching means is switched in response to ΔI or ΔV, whichever occurs first.

6. An arc welder control system as defined in claim 2, further comprising inductor means connected between said switching means and said electrode for supplying welding current to the arc when said source is decoupled from said electrode.

7. An arc welder control system responsive to the arc for automatically adjusting a power source supplying welding current to the arc comprising:
   a. a D.C. voltage source for supplying welding current to an electrode spaced from a workpiece to be welded;
   b. set point control means coupled between said source and said electrode for selecting a set point defined by a set welding current at a set welding arc voltage;
   c. feedback circuit means responsive to the actual arc voltage for maintaining said set current through the arc when the arc length corresponds to the set arc voltage;
   d. a bridge chopper circuit coupled between said source and said welding electrode and including four semiconductor switches, a commutating capacitor, and a free wheeling diode;
   e. means coupling said feedback circuit means to said bridge chopper circuit;
   f. a commutating inductor winding connected in series with said chopper and said welding electrode;
   g. a high current relatively low inductance inductor winding connected in series with said commutating inductor winding and a high current output stud adapted to be connected to said electrode, and
   h. a clamp diode connected between the junction of said commutating inductor winding and said high current inductor winding for preventing the voltage applied to said high current inductor winding from exceeding the source voltage.

8. An arc welder control system as defined in claim 7 further comprising a low current, relatively high inductance inductor winding connected in series between said high current output stud and a low current output stud adapted to be connected to said electrode, and additional current feedback from said low current output path to provide automatic recalibration of set current to a lower value and providing a much smaller $\Delta I$ ripple current.

9. An arc welder control system as defined in claim 7 further comprising logic circuit means for supplying gating pulses to selected ones of said semiconductor switches, and means responsive to said commutating capacitor voltage and coupled to said logic means for permitting the supply of gating pulses to said switches only in a predetermined sequence as determined by the magnitude and polarity of said capacitor voltage.

10. An arc welder control system as defined in claim 7 further comprising a weld thyristor switch connected between said chopper circuit and said high current inductor winding means for gating on said weld thyristor switch to permit inductive current to flow through the arc in a forward direction during a welding cycle when source current is turned off by said chopper circuit; a second thyristor switch and an auxiliary winding connected in series across said workpiece and said welding electrode, said auxiliary winding being inductively coupled to said high current winding; and means for gating on said second thyristor to permit the inductive current to flow through the arc in the reverse direction during an electrode cleaning cycle when the weld thyristor switch is not gated on.

11. An arc welder control system for use in a single spray transfer arc welding process, wherein a welding electrode is continuously fed toward a workpiece and spray transfer occurs when the welding current exceeds a transition current level and no spray transfer occurs when the welding current is at a very low level, and comprising:
 a. means for developing an arc length signal proportional to actual arc length;
 b. means for comparing said arc length signal with first and second signals proportional to preset maximum and minimum arc arc lengths of the arc, respectively;
 c. means coupled to said comparing means for controlling the welding current to a high value above said transition current level when the actual arc length decreases to said minimum arc length; and
 d. means coupled to said comparing means for controlling the welding current to a low value, at which no spray transfer occurs, when the arc length reaches said maximum arc length due to the burnback of the welding electrode when the welding current was above said transition level; whereby the spray transfer is automatically turned on and off to self-regulate the arc length between said preset maximum and minimum lengths regardless of the electrode feed rate, and whereby said high value of controlled welding current can be arbitrarily higher than said transition current level and is independent of wire feed rate, and whereby said low value of controlled welding current level is arbitrarily low and also independent of the wire feed rate.

\* \* \* \* \*